United States Patent

[11] 3,630,440

| [72] | Inventor | Ralf K. Sams |
| | | 10 Burbank Street, Yonkers, N.Y. 10710 |
| [21] | Appl. No. | 9,843 |
| [22] | Filed | Feb. 9, 1970 |
| [45] | Patented | Dec. 28, 1971 |

[54] EXTRACT-O-LIFTER
3 Claims, 7 Drawing Figs.

[52] U.S. Cl. .................................................. 238/14, 152/216
[51] Int. Cl. ......................................... E01b 23/00, B60t 3/00
[50] Field of Search ............................................. 238/14; 180/7; 152/208, 216; 188/32

[56] References Cited
UNITED STATES PATENTS

| 986,099 | 3/1911 | Sprung ......................... | 238/14 |
| 1,019,469 | 3/1912 | Heffernan ..................... | 238/14 |
| 1,815,435 | 7/1931 | Harding et al. ................ | 238/14 |
| 2,422,006 | 6/1947 | Friedman ...................... | 238/14 |
| 2,865,471 | 12/1958 | Chaussee ....................... | 238/14 |
| 2,975,977 | 3/1961 | Chodacki et al. .............. | 238/14 |
| 3,008,643 | 11/1961 | Tanner .......................... | 238/14 |
| 3,289,939 | 12/1966 | Martinov ....................... | 238/14 |
| 3,350,013 | 10/1967 | Bergquist ...................... | 238/14 |

*Primary Examiner*—Drayton E. Hoffman
*Assistant Examiner*—Richard A. Bertsch
*Attorney*—Ralf K. Sams ABSTRACT: A friction plate for placement under an automotive vehicle wheel so to gain traction when on ice or snow, the device comprising a woven mat with downward extending ice nails to hold against the ice, and upwardly extending nail heads for engaging the tire.

Patented Dec. 28, 1971 3,630,440
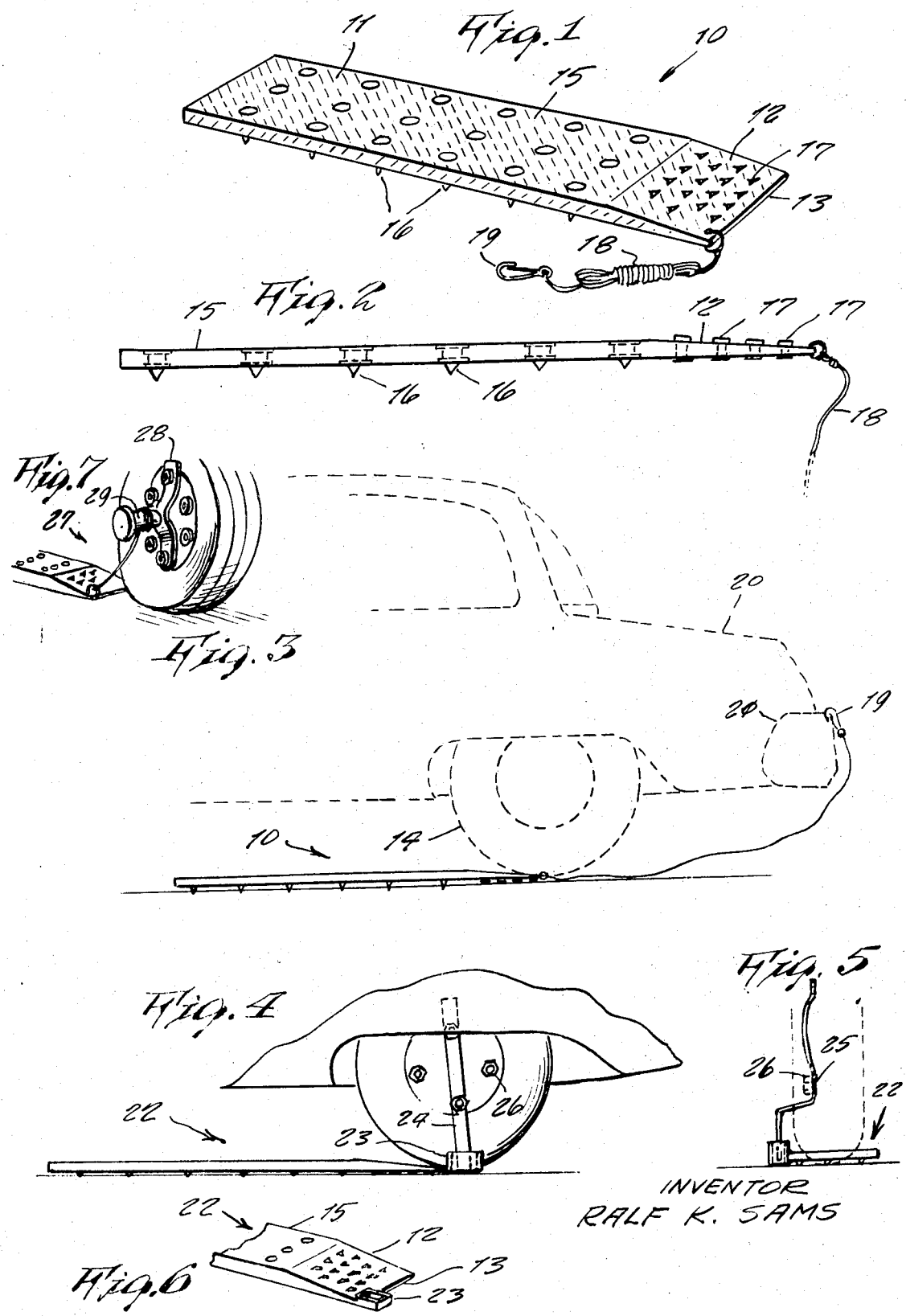
INVENTOR
RALF K. SAMS

EXTRACT-O-LIFTER

This invention relates generally to automotive accessories. More specifically it relates to traction-gaining means when the vehicle attempts to move over ice or snow.

A principal object of the presence invention is to provide an extract-o-lifter for use to provide traction to an automotive vehicle wheel when it is skidding on ice or snow such as when stuck in a ditch.

Another object is to provide an extract-o-lifter which comprises a woven mat having ice nails projecting downwardly to engage the ice, and nail heads projecting upwardly to frictionally engage the wheel tire.

Another object is to provide an extract-o-lifter which can be conveniently stored in the vehicle trunk for being always handy, and which takes up a minimum space.

Another object is to provide an extract-o-lifter which can be quickly placeable into operative use.

Still another object is to provide an extract-o-lifter which in use can be quickly tethered to the vehicle so that after the car is started to move out of a ditch or other stuck place, the device is not kicked away by the wheel and lost, but can be towed by the car until the vehicle is on a better surface after which the vehicle can be stopped and the device then detached and stored away into the trunk compartment.

Other objects are to provide an extract-o-lifter which is simple in design, inexpensive to manufacture, rugged in construction, easy to use and efficient in operation.

These and other objects will be readily evident upon a study of the following specification and the accompanying drawing wherein:

FIG. 1 is a perspective view of the invention.

FIG. 2 is a side edge view thereof.

FIG. 3 shows the device in operative use.

FIG. 4 is a similar view showing a modified design of the invention.

FIG. 5 is a rear view thereof.

FIG. 6 is a fragmentary perspective view thereof.

FIG. 7 is a perspective vie w of a further modified design of the invention.

Referring now to the drawing in detail, the reference numeral 10 represents an extract-o-lifter according to the present invention wherein there is, as shown in FIGS. 1 to 3, a woven mat 11 of elongated shape, the mat being of uniform thickness except at one longitudinal end where it has a diagonal upper surface 12 so that the mat tapers to a thin end edge 13 that can thus be easily tucked as fast as possible under a wheel tire 14. The uniformly thick portion 15 of the mat has downwardly projecting ice nails 16 for biting into an icy or snow surface for frictional securement thereto. The upper diagonal surface 12 has a plurality of upwardly extending triangular nail heads 17 so to match the snow tire groves for frictional purpose therewith. At one corner of the edge 13, one end of a tethering nylon rope 18 is secured, the opposite end of the rope having a snap hook 19.

In operative use, as shown in FIG. 3, when a vehicle 20 is stuck on ice, snow, mud or sand, the leading edge 13 is fitted as far as possible under the wheel tire, and the snap hook is secured to the vehicle bumper 21 or other convenient part of the car. The car is started and easily driven over the mat, thus getting the vehicle upon an improved road surface, the vehicle towing the extract-o-lifter behind it, after which it can be removed.

In FIGS. 4 to 6, a modified design 22 of the invention is shown to be generally similar but wherein along one end of the leading or feathering edge 13 there is a collar 23 integral with the mat, the collar projecting forwardly beyond the edge 13 so as to receive therein one end of a metal strap or bar 24 having openings 25 therethrough so to be mounted on the wheel lug bolts 26 and secured temporarily thereto. In this form of the invention, further assurance is provided for getting the skidding wheel to get upon the mat. When the car is started the rotating wheel thus pulls the mat under itself. It is to be noted that the bar does not protrude extensively far beyond the tire peripheral edge, nor is positioned too far from a side of the tire so that when the wheel spins, the bar does not strike the car fender. It is to be further noted that once the wheel gets on the mat, the rotational travel of the bar automatically disengages with the mat positioned flat therebelow thus preventing the mat from wrapping around the tire.

In FIG. 7 another modified design 27 of the invention is shown wherein the metal strap or bar 28 secured to the wheel, has a sidewardly extending spindle 29 which is in axial alignment with the wheel axis; the rope 18 being tethered to the spindle. In use the rotating wheel winds up the rope causing the mat to be forcibly pulled under the tire.

While various changes may be made in the detail construction, it is understood that such changes will be within the spirit and scope of the present invention as is defined by the appended claims.

I claim as follows:

1. A traction mat for vehicles comprising an elongated flexible mat having a portion of uniform thickness and inclined portion extending therefrom to a thin leading edge, said inclined portion having nail heads extending upwardly therefrom and said uniform portion having nail heads extending downwardly therefrom, in combination with a means for attaching the mat leading edge to the wheel in a removable fashion whereby wheel rotation causes the mat to be drawn forcibly under the wheel during wheel rotation.

2. A mat as in claim 1 wherein said means is a bar attachable to a wheel stud at one end and said mat includes a laterally projecting fixture with a vertical recess, adapted to receive the other end of said bar.

3. A mat as in claim 1 wherein the said means comprise a tether attached to said leading edge at one end and a spindle adapted to be mounted on the vehicle wheel axle, said tether being attached to said spindle whereby wheel rotation causes the tether to wrap around the spindle thereby drawing the mat under the wheel.

* * * * *